United States Patent [19]

McMullen

[11] Patent Number: 4,846,658

[45] Date of Patent: Jul. 11, 1989

[54] EXTRUSION DIE

[76] Inventor: Ronald D. McMullen, 974 Elaine Ave., Livermore, Calif. 94550

[21] Appl. No.: 208,647

[22] Filed: Jun. 20, 1988

[51] Int. Cl.⁴ .............................................. B29C 47/12
[52] U.S. Cl. ................................. 425/197; 264/209.1; 264/209.8; 425/380; 425/382.4; 425/466; 425/467
[58] Field of Search ......................... 264/209.8, 209.1; 425/380, 467, 461–466, 382.4, 197

[56] References Cited

U.S. PATENT DOCUMENTS

| | | | |
|---|---|---|---|
| 2,345,086 | 3/1944 | Becker et al. | 425/380 |
| 3,069,724 | 12/1962 | Schiedrum | 425/380 |
| 3,193,879 | 7/1965 | Corbett | 425/461 |
| 3,488,669 | 1/1970 | Goodrum et al. | 425/381 |
| 3,756,758 | 9/1973 | Prall | 425/467 |
| 3,809,515 | 5/1974 | Farrell | 425/467 |
| 3,965,931 | 6/1976 | Skobel | 264/176.1 |
| 4,509,907 | 4/1985 | Ratheiser | 264/209.8 |

FOREIGN PATENT DOCUMENTS

| | | | |
|---|---|---|---|
| 1227312 | 9/1987 | Canada | 425/461 |
| 1953114 | 5/1971 | Fed. Rep. of Germany | 425/461 |
| 2211854 | 9/1973 | Fed. Rep. of Germany | 425/467 |
| 39-20772 | 8/1964 | Japan | 425/380 |

Primary Examiner—Jeffery Thurlow
Attorney, Agent, or Firm—Linval B. Castle

[57] ABSTRACT

A flow distributor for use in an extrusion assembly for producing tubing, pipe or blown film from a fluid melt. The distributor is cylindrical with adjacent arcuate channels on both interior and exterior surfaces for respectively forming the inner and outer layers of the extrudate from a fluid melt forced through longitudinal holes into each of the channels. The inner and outer layers are formed in a continuous circular flow so that there is no weld line in each layer; however, when the two layers are merged into a finished extrudate, a single circular weld line is formed at their merged surface and results in a very strong extrudate that resists bursting forces.

7 Claims, 2 Drawing Sheets

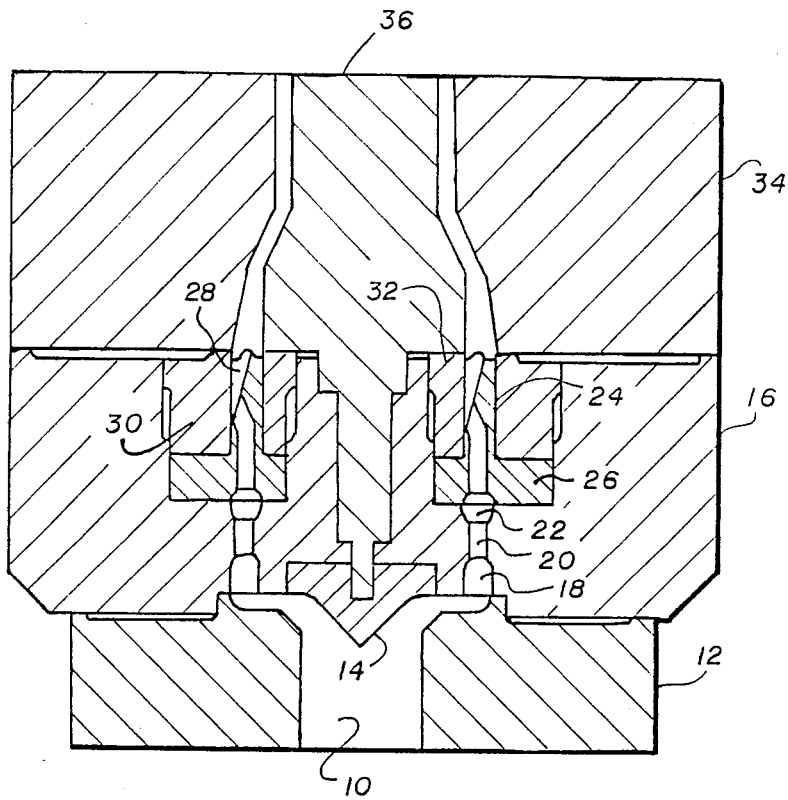
FIG. 1
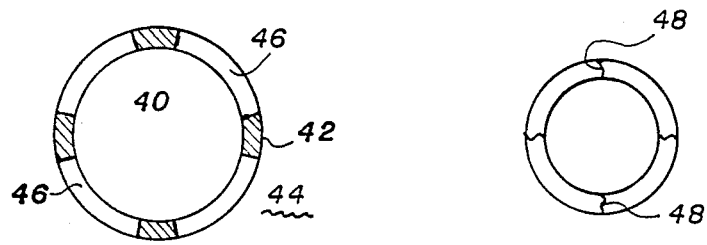
FIG. 2 PRIOR ART   FIG. 3 PRIOR ART
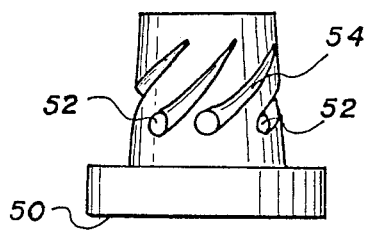 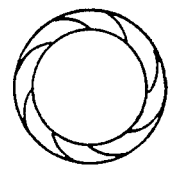
FIG. 4 PRIOR ART   FIG. 5 PRIOR ART

EXTRUSION DIE

This invention relates to extrusion dies and particularly to a novel flow distributor for use in extrusion assemblies that may be used in the production of plastic film, tubing or pipe.

BACKGROUND OF THE INVENTION

The production of nearly all plastic films, tubing or pipe is performed by substantially the same process of heating the bulk plastic material to a soft stage, or melt, and then forcing it through a heated die assembly. The extrusion assembly includes a heated body containing a smooth tubular outer ring which forms the exterior surface of the extrudate and a rodlike coaxial inner core or mandrel that forms the smooth bore of the extrudate. In some instances the extrudate is first formed with a larger diameter and thicker walls than desired in the finished product and is then reduced and thinned by forcing the extrusion through a heated outer ring with a coaxial center mandrel. One problem encountered in the fabrication of such a die assembly is that of assuring that the mandrel remains precisely coaxial with the ring so that the wall thickness of the final extrudate is of a constant and equal thickness.

One type of die presently in use is referred to as a spider die which contains two or more small streamlined spacers that are fitted between inner mandrel and outer ring and in the flow path of the melt. The rejoined segments of the melt that passed between the spacers in the spider die, while invisible and apparently homogeneous in the final extrudate, form radial weld lines which tend to weaken the extrudate against radial forces.

Another type of die designed to overcome the poor melt distribution in the extrudates formed by the spider die is the spiral die which contains an inner mandrel and outer ring which spreads the fluid melt in spiral channels from a exterior of the truncated conical mandrel surface. A higher pressure is required to pump the melt through a spiral die because the very thick melt entering the die must be forced around right angled turns to enter and exit the spiral channels. The weld lines in an extrudate from a spiral die are spirals extending between the bore and outer surface of the extrudate, and because the melt from the channels overlaps there is greater distribution of the melt than of an identically appearing extrudate fabricated by the earlier described spider die.

The invention to be described herein is for an improved flow distributor between the inner mandrel and outer ring of a die assembly, the distributor producing extrudates with a single weld line that does not intercept either the bore or the exterior surface of an extrudate and has much greater bursting strength than either extrudates formed by spider dies or spiral dies. This makes the distributor not only superior for extruding pipes and tubing, but similarly superior for blown film applications.

BRIEF SUMMARY OF THE INVENTION

Briefly described, the improved flow distributor separating the inner mandrel and outer ring of a die assembly receives hot fluid melt through a plurality of holes formed in a circular pattern in a first end of the distributor and, with only very slight bends in the flow, forces it out through openings alternately staggered in open tapered adjacent channels formed in both the interior and exterior surfaces of the distributor In a preferred embodiment, there are nine tapered adjacent channels around the exterior of the distributor, the side edges of each channel contacting the edges of its neighboring channels. The distributor also has nine tapered adjacent channels around the interior surface that are spaced between the channels on the exterior surface. The interior channels extrude the bore part of the extrudate, the lobes on the external part of this bore part meshing with the lobes of the exterior part to form a completely fabricated extrudate with a weld line forming a cylindrical loop within the cross section of the extrudate. The result is a very strong extrudate which, in impact tests made with $2\frac{1}{2}$ inch extruded pipes, has muct greater strength than identical appearing pipes made with a spider die.

Extrusion dies employing the improved flow distributor of the invention display several additional features in addition to the increased impact strength of the extrudate. Because the flow input to flow output is substantially short with no right angle paths, there is a low shear rate resulting in high output and low extrusion pressure losses. Also because the flow path is nearly straight, the residence time of plastic within the extrusion die is held to a minimum, resulting in a low material inventory and this low inventory lowers the melt residence time and reduces the possibility that the melt will create gels or will burn from being subjected to excessive heat. Further, the streamlined channels in the direction of the extrudate flow provides for the use of a wide range of processing resins.

DESCRIPTION OF THE DRAWINGS

In the drawings which illustrate a preferred embodiment of the invention:

FIG. 1 is a sectional view of a die assembly containing the flow distributor of the invention;

FIG. 2 is an end view of a prior art spider die;

FIG. 3 is a cross section of extrudate formed with a spider die and shows the resulting radial weld lines;

FIG. 4 is an elevational view of the prior art flow mandrel in a spiral die;

FIG. 5 is a cross section of extrudate formed with the spiral die and shows the resulting spiral weld lines;

DETAILED DESCRIPTION OF THE PREFERRED EMBODIMENT

Figure 6:
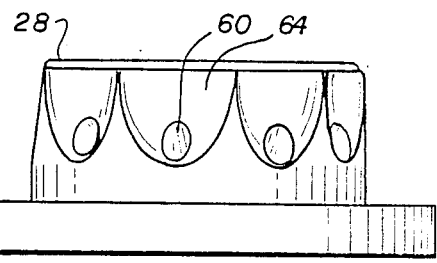
FIG. 6 is an elevational view of the improved flow distributor of the invention.

FIG. 1 is a sectional view of a complete die assembly containing the novel flow distributor which is the subject matter of the invention. A column of thick but fluid melt is pumped into the assembly through an entrance opening 10 centered in a die flange 12 where the column is opened by a die cone 14 axially mounted in the heated main body 16 of the die assembly. The melt then passes into each of a plurality of openings 18 in the entrance end of the main body 16 and through a plurality of longitudinal openings 20 into a second large openings 22 in the bottom of a deep circular slot in the main body.

Located on the floor of this deep circular slot is the flow distributor 24 which will be later described in detail in connection with FIGS. 6–9.

The flow distributor 24 includes a wide annular ring base 26 which fits within the deep circular slot in the main body. The base 26 supports an attached tubular shaped member 28 which is formed to spread the fluid melt into inner and outer layer portions as will be later described. To obtain a smooth extrudate surfaces, an outer ring or deflector 30 contacts the exterior of the member 28 and an inner ring or deflector 32 contacts the interior surface of the member 28. Both deflectors 30 and 32 rest on the annular ring base 26 of the flow distributor and are positioned between the surfaces of tubular member 28 and the walls of the deep circular slot in the main body.

The output of the distributor 24 is coupled to an annular body extension 34 and also an axial center bushing 36 which is connected into the main body 16. The body extension 34 and center bushing 36 operate to merge the inner and outer layers of the melt extruded by the distributor to firmly bind them together into an extrudate before it leaves the die.

The complete die assembly is coupled together by longitudinal bolts (not shown) and the main body 16 and body extension 34 are individually temperature monitored and heated to the proper temperatures by encircling heater bands (not shown).

The die assembly, per se, is not new and other types of flow distributors have been used in such an assembly in the fabrication of prior art extrudates.

FIG. 2 is a simplified end view illustrating a prior art spider die in which a center bushing 40 is held in position by four spacers 42 between the center bushing and the outer ring 44. The fluid melt is extruded through the arcuate openings 46 so that, when the individual strips of melt passing through the openings are united to form an extrudate, the interconnections or weld lines 48 appear as radial lines in a cross section of the extrudate as shown in FIG. 3. Because these weld lines are formed, the extrudate is not homogeneous and there is a weakness along the weld lines.

The prior art spiral die illustrated in FIG. 4 extrudes with strong overlapping weld lines, as shown in FIG. 5, instead of the edge butted weld lines of the spider die. The spiral die receives the fluid melt through holes in the bottom 50 and forces it through radial openings 52 and thence at right angles into spiral channels 54 formed in the exterior surface of a tapering or truncated conical body. While the spiral die produces uniform distribution, the right angle turns required of the melt require extraordinarily high pressures and stronger and more costly extrusion apparatus.

Figure 7:
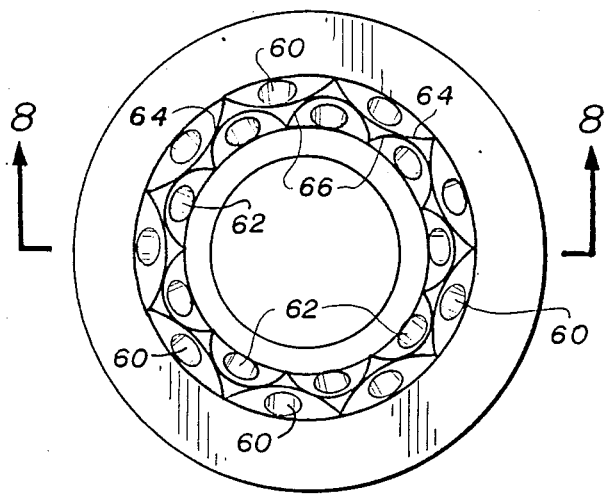
FIG. 7 is a top plan view of the flow distributor of FIG. 6.
Figure 9:
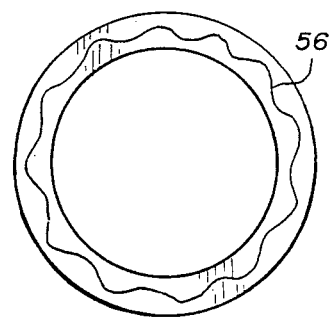
FIG. 9 is a cross section of extrudate formed with a die assembly using the flow distributor of the invention, and shows the resulting circular weld line.
Figure 8:
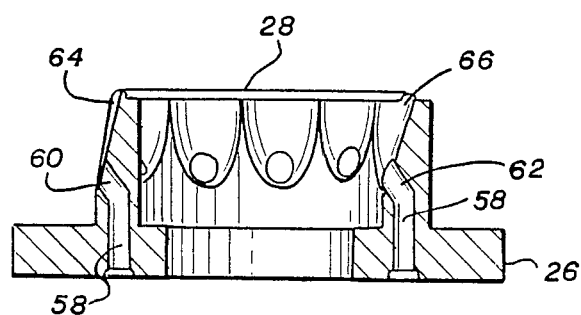
FIG. 8 is a sectional view taken along the lines 8—8 of FIG. 7.

The improved flow distributor is illustrated in FIGS. 6–8 and the resulting extrudate cross sectional weld line 56 is shown in FIG. 9.

FIG. 6 is an elevation view of the flow distributor and illustrates the base 26 and its vertical tubular shaped member 28. As best shown in FIG. 8, thick melt is forced from the main body of the die assembly into longitudinal holes 58 axially arranged in a circular pattern around the bottom of the base. The fluid then flows longitudinally through the holes and into secondary holes bored at a small angle from the longitudinal holes 58.

In the preferred embodiment, there are a total of eighteen evenly spaced longitudinal holes 58; nine secondary holes 60 intersecting the longitudinal holes are evenly spaced and are at an angle of 25° off the longitudinal axis to direct the melt outward to the exterior of an extrudate; the remaining nine secondary holes 62 are spaced between the holes 60 and are at an angle of 20° off the axis to direct the melt inward to the interior of the extrudate.

Cut at an angle of about 14° into the exterior circular surface of the member 28, and at an angle opposite in direction to the secondary holes 60, are nine evenly spaced arcuate concave channels 64. The channels have a suitable diameter so that the edge of each channel 64 will intersect the edges of each adjacent channel 64, as best shown in FIG. 7. The center of each channel 64 intersects an offset secondary hole 60 so that melt passing from the hole 60 will be spread by the channels against the smooth surface of the outer deflector 30 of FIG. 1 to form the exterior surface or layer of an extrudate.

Similarly, the secondary holes 62 intersect oppositely offset channels 66 cut in the interior surface of the member 28. Channels 66 are cut at an angle of about 17° to the longitudinal axis and have a suitable diameter so that each edge of the nine channels 66 will intersect the edges of its adjacent channels 66 as best shown in FIG. 7. Melt pumped through the inner holes 62 into the channels 66 will therefore spread to form the inner surface or layer of an extrudate.

It will be noted that the fluid melt passing through the flow distributor of the invention is not passed around sharp corners and flows smoothly to both the exterior and interior portions of the member 26 to form the cylindrical or circular weld line 56 shown in FIG. 9 which does not intersect either interior or exterior surface of the extrudate. The resulting extrudate is much stronger than extrudates through prior art spider or spiral dies and can withstand very high impacts without danger of rupturing.

I claim:

1. In combination with a die assembly for fabricating extrudates from fluid melts and having an input passage and output passage, a flow distributor for forming the extrudates, said distributor comprising:

a circular body portion having a base and tubular member extending laterally from said base between the cylindrical surfaces of an inner deflector ring and outer deflector ring in said die assembly;

a plurality of spaced holes laterally extending through said base and communicating with the input passage of the die assembly for passing fluid melt into said body portion;

a plurality of adjacent first open arcuate concave channels formed at an angle around the exterior surface of said tubular member, the edges of each of said channels intersecting the edges of its adjacent first channels, the center of each of said channels intersecting one of said plurality of spaced holes; and a plurality of adjacent second open arcuate concave channels formed at an angle around the interior surface of said tubular member, the edges of each of said second channels intersecting the edges of its adjacent second channels, the center of each of said channels intersecting a different one of said plurality of spaced holes, the radial positions of said second channels being staggered between the positions of said first channels.

2. The flow distributor claimed in claim 1 wherein said plurality of spaced holes are an even number, and wherein said plurality of adjacent first channels is equal to the number of said second channels.

3. The flow distributor claimed in claim 1 wherein said plurality of spaced holes extend longitudinally through said base and a portion of said tubular member and intersect secondary holes, said secondary holes being angled toward their respective channels.

4. The flow distributor claimed in claim 1 wherein said adjacent second channels cooperate with an inner deflector in said die assembly to form the inner portion of an extrudate and wherein said adjacent first channels cooperate with an outer deflector in said die assembly to form the outer portion of the extrudate.

5. In an extrusion die assembly for the fabrication of extrudates from a melt forced in the die assembly, an extrudate forming flow distributor for forming the extrudate comprising:

a first plurality of adjacent open concave channels formed at an angle around an exterior arcuate surface of said distributor for spreading against a deflector surface an arcuate flow of melt representig the exterior surface of the extrudate;

a second plurality of adjacent open concave channels formed at an angle around an interior arcuate surface of said distributor for spreading against a second deflector surface an arcuate flow of melt representing the interior of the extrudate, said first and second pluralities being intermeshedj between each other; and conduit means for introducing the forced flow of melt into said first and said second plurality of channels.

6. The distributor claimed in claim 5 wherein said first and second deflectors are circular.

7. The distributor claimed in claim 6 further including an output extension for merging and binding together the arcuate flow of melt representing the interior of the extrudate with the arcuate flow of melt representing the exterior of the extrudate.

* * * * *